US008161326B2

United States Patent
Dixit et al.

(10) Patent No.: US 8,161,326 B2
(45) Date of Patent: Apr. 17, 2012

(54) METHOD AND SYSTEM FOR MANAGING INFORMATION TECHNOLOGY (IT) INFRASTRUCTURAL ELEMENTS

(75) Inventors: Milind Vinod Dixit, Maharashtra (IN); Binny Chacko, Kerala (IN); Sridhar Kondiparthy, Maharashtra (IN)

(73) Assignee: Infosys Technologies Limited (IN)

( * ) Notice: Subject to any disclaimer, the term of this patent is extended or adjusted under 35 U.S.C. 154(b) by 0 days.

(21) Appl. No.: 12/568,207

(22) Filed: Sep. 28, 2009

(65) Prior Publication Data

US 2010/0082388 A1    Apr. 1, 2010

(30) Foreign Application Priority Data

Sep. 29, 2008    (IN) .......................... 2382/CHE/2008

(51) Int. Cl.
*G06F 11/00*    (2006.01)
(52) U.S. Cl. ............... 714/27; 714/4.1; 714/26; 714/39; 714/48; 714/57
(58) Field of Classification Search ................. 714/4, 26, 714/27, 39, 48, 57, 4.1
See application file for complete search history.

(56) References Cited

U.S. PATENT DOCUMENTS

| 5,666,481 | A  | * | 9/1997  | Lewis ............................... 714/4 |
| 6,603,396 | B2 | * | 8/2003  | Lewis et al. ................... 340/506 |
| 6,742,141 | B1 | * | 5/2004  | Miller ............................. 714/26 |
| 7,266,734 | B2 | * | 9/2007  | Chavez et al. ................... 714/48 |
| 7,434,099 | B2 | * | 10/2008 | Flynn et al. ..................... 714/26 |
| 7,818,631 | B1 | * | 10/2010 | Halikhedkar et al. .......... 714/48 |
| 2002/0087680 | A1 | * | 7/2002 | Cerami et al. ................ 709/224 |
| 2005/0193285 | A1 | * | 9/2005 | Jeon ................................ 714/48 |
| 2006/0112175 | A1 | * | 5/2006 | Sellers et al. ................. 709/223 |

* cited by examiner

*Primary Examiner* — Charles Ehne
(74) *Attorney, Agent, or Firm* — Cantor Colburn LLP

(57) ABSTRACT

The present invention provides a method, system and computer program product for managing the Information Technology (IT) infrastructural elements of multiple organizations. The system monitors various IT infrastructural elements, such as networks, operating systems, databases, and software applications of multiple organizations. Alerts corresponding to various issues related to the IT infrastructural elements are generated. Based on the alerts, the system provides information related to the issues to a support team for solving them.

31 Claims, 8 Drawing Sheets

METHOD AND SYSTEM FOR MANAGING INFORMATION TECHNOLOGY (IT) INFRASTRUCTURAL ELEMENTS

BACKGROUND

The present invention relates to a system for managing the Information Technology (IT) infrastructural elements of a plurality of organizations. More specifically, it relates to a system and method for managing networks, databases, software applications, and operating systems of the plurality of organizations.

An issue-tracking system is generally used by a support team of an organization for tracking various IT infrastructure-related issues. Various IT infrastructure issues are monitored by the issue-tracking system or may be reported by the employees of the organization. The issue-tracking system generates a ticket corresponding to an issue. The ticket is a file that includes information to resolve the issue. The information includes the type of issue, date, time and location of the issue, details of a support person assigned to resolve the issue, and the like. This ticket is sent to the support team for remedy.

Various such systems are available for monitoring and managing, but they are compatible with very limited types of IT infrastructural elements of an organization. Moreover, the systems are not designed for monitoring and managing networks, databases, software applications, and operating systems of multiple organizations simultaneously. These systems are also not adaptable to integrate various products provided by multiple IT service providers or vendors.

In light of the foregoing, there is a need for an improved system for managing IT infrastructural elements of multiple organizations. Further, the system should be adaptable to perform with various similar products provided by other IT service providers.

SUMMARY

An object of the invention is to manage the Information Technology (IT) infrastructural elements of multiple organizations.

Another object of the invention is to provide one or more software agents to the IT infrastructural elements for polling one or more parameters of each of the IT infrastructural elements.

To achieve the objectives mentioned above, the invention provides a system, method and computer program product for managing the IT infrastructural elements of multiple organizations. The system may be installed at the service provider, such as an IT service provider to manage the IT infrastructural elements of multiple organizations.

The IT infrastructural elements include operating systems, networks, databases, and software applications. The system includes a monitoring module, an event management module, and a service desk module.

The monitoring module monitors the one or more parameters of the IT infrastructural elements to generate one or more alerts. The monitoring is performed by polling the parameters using one or more software agents corresponding to the IT infrastructural elements of more than one organization. As a result, the system monitors the IT infrastructural elements of multiple organizations simultaneously. The event management module performs filtering and prioritizing of the generated alerts. Further, the event management module tags the filtered and prioritized alerts by assigning one or more attributes. The service desk module manages one or more tickets corresponding to the one or more alerts. The service desk module includes a ticket generation module and an approval module. A ticket for an alert of the one or more alerts, corresponding to an issue is generated by a ticket generation module. The approval module sends the ticket to an authorized approver for approval. Finally, the ticket is sent to the support team to resolve the issue.

The system described above has a number of advantages. The system manages the IT infrastructural elements of multiple organizations. The system provides multi-tenancy to IT service providers because it can monitor the IT infrastructural elements of multiple organizations simultaneously. Further, the system is also adaptable to integrate products provided by various vendors for monitoring the parameters.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DESCRIPTION OF VARIOUS EMBODIMENTS

The invention describes a method, system and computer program product for managing one or more IT infrastructural elements of a plurality of organizations. The IT infrastructural elements may include operating systems, networks, databases, software applications, and the like. The one or more parameters of the IT infrastructural elements are monitored for generating one or more alerts. Issues corresponding to the alerts are identified and thereafter information related to the issues is sent to a support team to resolve the issues.

Figure 1:
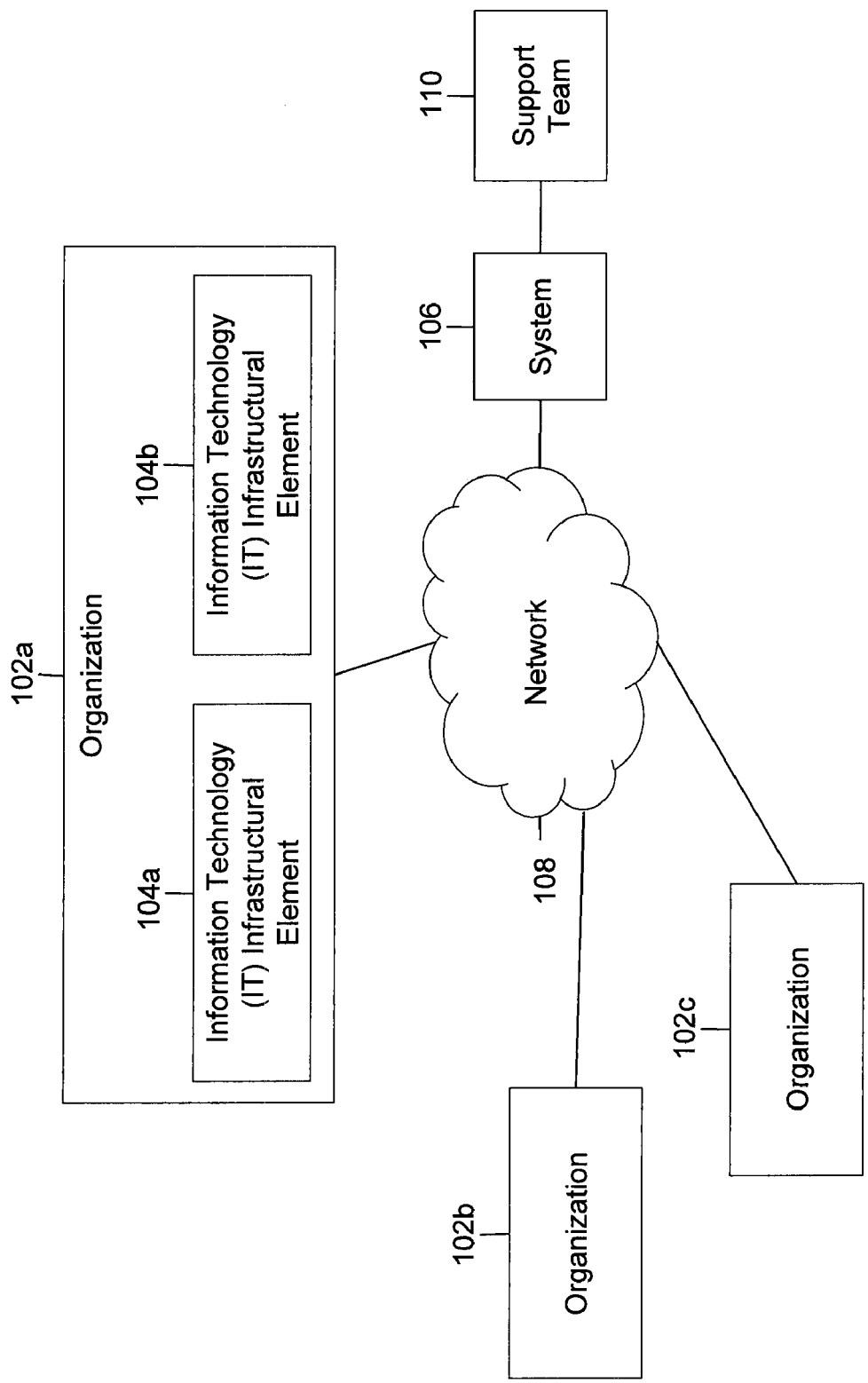
FIG. 1 illustrates an environment in which various embodiments of the invention may be practiced.

FIG. 1 illustrates an environment in which various embodiments of the invention may be practiced. The environment includes a plurality of organizations, such as organizations 102a, 102b and 102c, one or more Information Technology (IT) infrastructural elements, such as IT infrastructural elements 104a and 104b, a system 106, a network 108 and a support team 110.

Examples of IT infrastructural elements 104*a* and 104*b*, hereinafter referred to as IT infrastructural elements 104, include operating systems, networks, databases, software applications, and the like. It will be apparent to any person skilled in the art that organizations 102*b* and 102*c* also include IT infrastructural elements such as IT infrastructural elements 104. Organizations 102*a*, 102*b* and 102*c* are hereinafter referred to as a plurality of organizations 102. Plurality of organizations 102 and system 106 are connected to network 108. Support team 110 includes a group of technologists who are capable of solving various issues related to IT infrastructural elements 104 of plurality of organizations 102.

System 106 monitors one or more parameters of IT infrastructural elements 104 of plurality of organizations 102. The parameters are monitored to generate alerts corresponding to various issues related to IT infrastructural elements 104. System 106 identifies the issues corresponding to the alerts. System 106 provides information related to the issues to support team 110 for resolving them. Support team 110 resolves the issues, based on the information provided by system 106.

Figure 2:
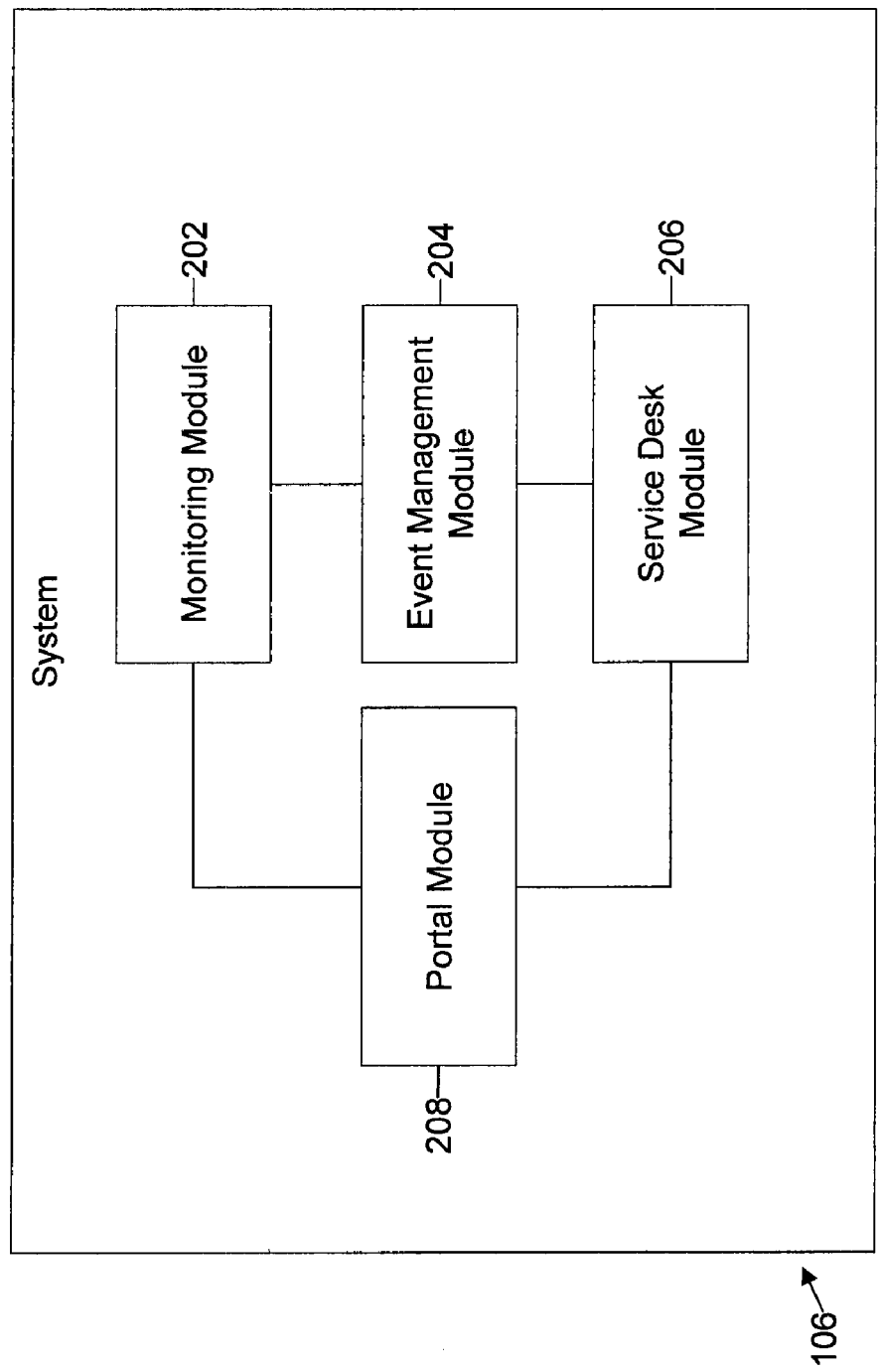
FIG. 2 is a block diagram of a system for managing one or more Information Technology (IT) infrastructural elements of a plurality of organizations, in accordance with an embodiment of the invention.

FIG. 2 is a block diagram of system 106 to manage Information Technology (IT) infrastructural elements 104 of plurality of organizations 102, in accordance with an embodiment of the invention. System 106 includes a monitoring module 202, an event management module 204, a service desk module 206 and a portal module 208.

Monitoring module 202 monitors the one or more parameters of IT infrastructural elements 104 to generate one or more alerts. The generated alerts are provided to event management module 204. Event management module 204 processes the alerts. Event management module 204 also tags the alerts by assigning one or more attributes. The tagged alerts are provided to service desk module 206. Service desk module 206 generates one or more tickets, based on the tagged alerts, and provides the tickets to support team 110 to resolve the issues corresponding to the tickets. Portal module 208 provides a graphical representation of the various activities of monitoring module 202 and service desk module 206.

Monitoring module 202 monitors the parameters to generate alerts corresponding to various issues related to IT infrastructural elements 104. The monitoring is performed by polling the parameters at regular time intervals. Monitoring module 202 includes monitoring software to monitor the parameters. Examples of the monitoring software include BMC Patrol Central®, BMC Patrol Express® from BMC®, HP NNM® from HP®, Tivoli® from IBM®, and a monitoring tool from Mercury Interactive®. In an embodiment of the invention, an issue is an event when the value of a parameter increases beyond a corresponding threshold value. For example, if a parameter such as the used memory space corresponding to a memory device increases beyond a certain percentage, an alert corresponding to this issue is generated. In another embodiment of the invention, the issue is an event when the IT infrastructural element, such as IT infrastructural element 104*a* or IT infrastructural element 104*b*, stops functioning. For example, if a server stops functioning, an alert corresponding to this issue is generated. The details of monitoring module 202 are described in conjunction with FIG. 3.

Event management module 204 receives the alerts from monitoring module 202 and processes them. The processing of the alerts includes filtering, prioritizing, and tagging the alerts. Event management module 204 includes an event management software to process the received alerts. An example of such event management software is BMC Event Manager® from BMC®. Event management module 204 filters and prioritizes the alerts received from monitoring module 202. The filtering is performed to avoid duplicity of the alerts. For example, an alert has been generated for an issue related to a memory, such as a hard drive, during a polling cycle at 3:00 p.m. on a particular day. In the next polling cycle, another alert may be generated for the same issue if the issue has not yet been resolved. To avoid such duplicity of alerts, the filtering operation is performed. Further, the prioritizing is performed to assign a priority to the alert corresponding to the issue. The priority is assigned to the alerts, based on the order in which the alerts are generated. For example, if the alert corresponding to the server is generated prior to the alert corresponding to the hard drive, a high priority is assigned to the alert corresponding to the server. Event management module 204 further tags the alerts by assigning one or more attributes to the one or more alerts. The attributes are assigned, based on the filtering and prioritizing of the alerts. The attributes include a source of the alert, a priority corresponding to the alert, information about a user of the corresponding IT infrastructural elements 104, the date and time of the issue, the location of the issue, and so forth.

Service desk module 206 receives the tagged alerts from event management module 204 and generates one or more tickets corresponding to the received alerts. A ticket includes information corresponding to an alert to resolve the issue. Further, the generation of the ticket is explained in detail in conjunction with FIG. 5 and FIG. 6. The ticket is then provided to support team 110 to solve the corresponding issue.

Portal module 208 provides a graphical user interface to monitoring module 202 and service desk module 206. Portal module 208 provides various reports to plurality of organizations 102. The reports include various graphs and tables. In an embodiment of the invention, the reports provided by portal module 208 are based on the viewer's profile. For example, the reports provided to a CEO of organization 102 are different from the reports provided to the IT manager of organization 102.

Figure 3:
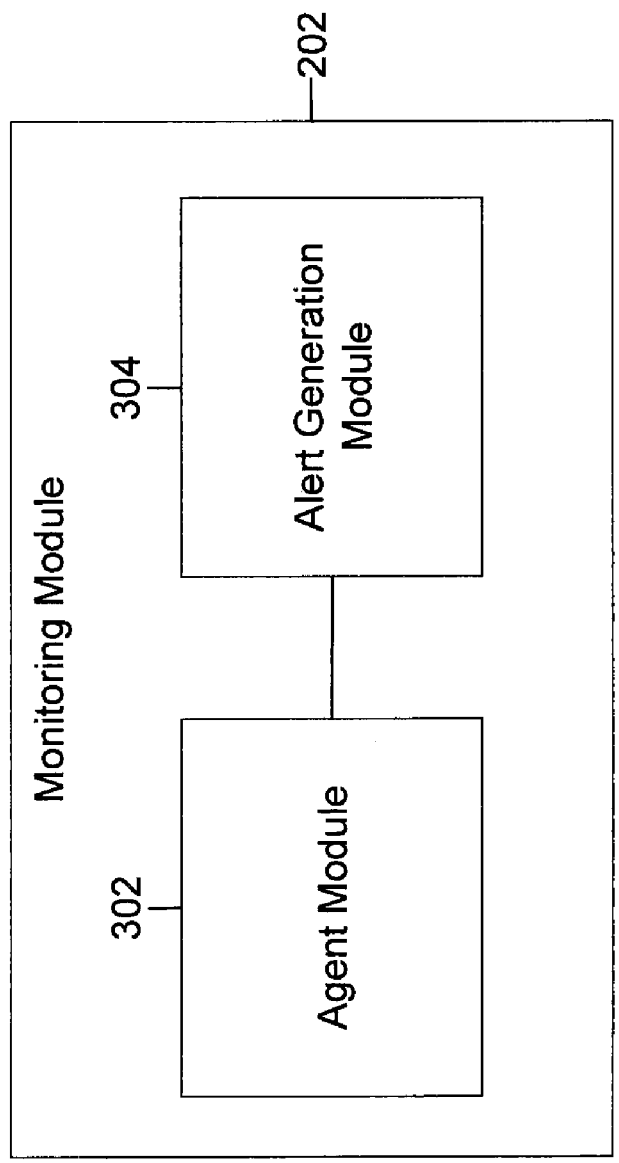
FIG. 3 is a block diagram of a monitoring module for monitoring one or more parameters of the one or more IT infrastructural elements, in accordance with an embodiment of the invention.

FIG. 3 is a block diagram of monitoring module 202 to monitor one or more parameters of IT infrastructural elements 104, in accordance with an embodiment of the invention. Monitoring module 202 includes an agent module 302 and an alert generation module 304.

Agent module 302 provides one or more software agents for monitoring the parameters of IT infrastructural elements 104. Alert generation module 304 generates one or more alerts corresponding to various issues related to IT infrastructural elements 104.

Agent module 302 provides software agents corresponding to the parameters. The software agents are provided to IT infrastructural elements 104. The software agents continuously poll the corresponding parameters of IT infrastructural elements 104. The details of agent module 302 are explained in conjunction with FIG. 4.

Alert generation module 304 generates one or more alerts corresponding to various issues related to IT infrastructural elements 104. In an embodiment of the invention, alert generation module 304 generates the alerts based on the monitored parameters. The values of the monitored parameters are compared with the corresponding threshold values of the parameters. If a value of a parameter is greater than the corresponding threshold value, then an alert corresponding to that parameter is generated. For example, if the used space in a memory increases beyond a certain percentage, then alert generation module 304 generates an alert for this issue.

In an embodiment of the invention, monitoring module 202 checks the availability of IT infrastructural elements 104. IT infrastructural elements 104 are considered to be unavailable if IT infrastructural elements 104 stop functioning. Alert generation module 304 generates alerts based on the availability of IT infrastructure elements 104.

Figure 4:
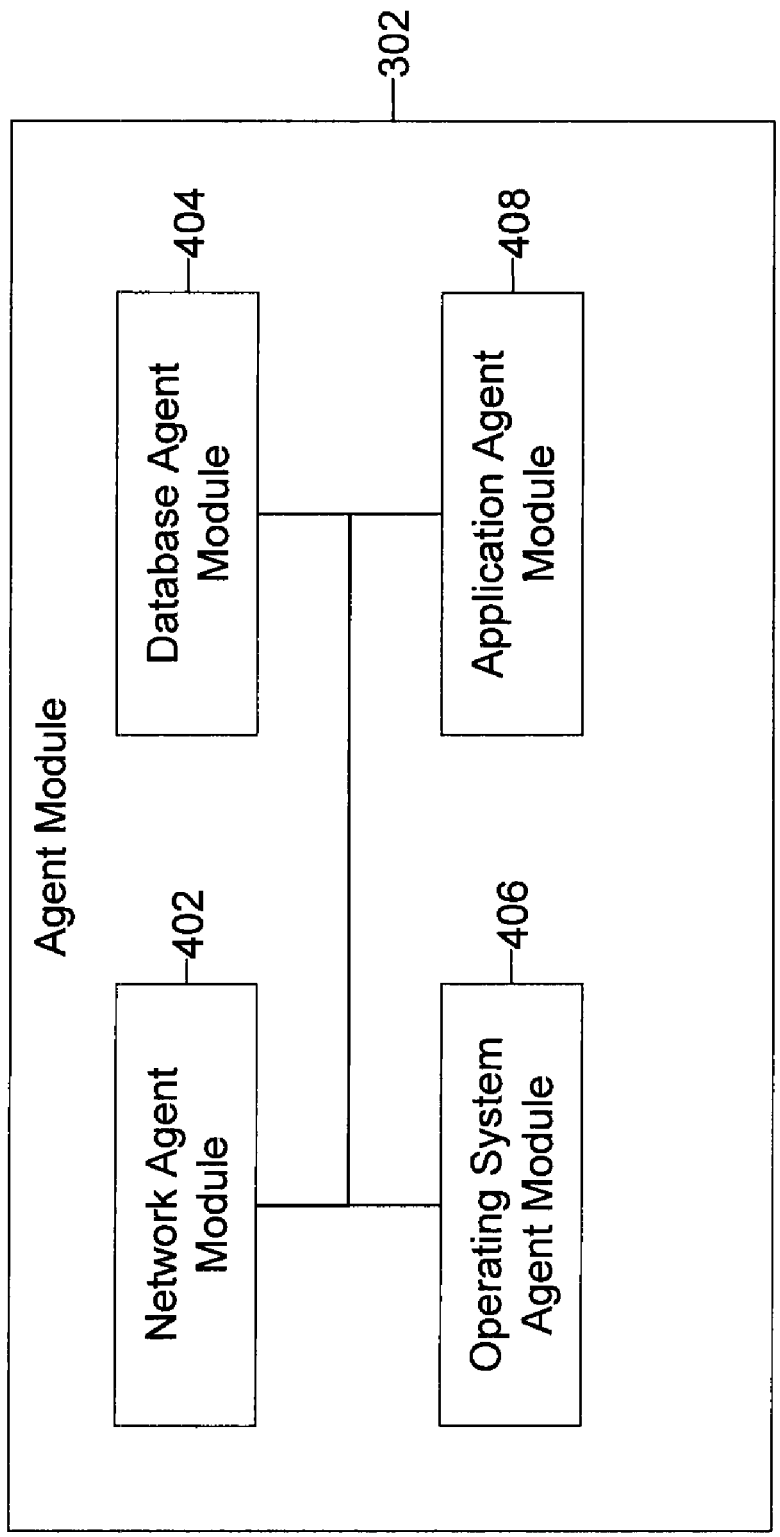
FIG. 4 is a block diagram of an agent module for providing one or more software agents for polling the one or more parameters, in accordance with an embodiment of the invention.

FIG. 4 is a block diagram of agent module 302 for providing one or more software agents for polling the one or more parameters, in accordance with an embodiment of the invention. Agent module 302 includes a network agent module 402, a database agent module 404, an operating system agent module 406 and an application agent module 408.

Network agent module 402 provides software agents to poll various parameters of the networks. Examples of the parameters of the networks include, but are not limited to, the consumed bandwidth and the network traffic.

Database agent module 404 provides software agents to poll various parameters of the databases. Examples of the parameters of the databases include, but are not limited to, a used table space, a read buffer hit, a write buffer hit, a buffer hit ratio, a number of users, and a directory hit ratio.

Operating system agent module 406 provides software agents to various polling parameters of the operating systems. Examples of the parameters of the one or more operating systems include, but are not limited to, CPU utilization, memory utilization, a used space in a memory, and page file usage.

Application agent module 408 provides software agents to poll various parameters of the software applications. Examples of the parameters of the one or more software applications include, but are not limited to, a number of users and number replications. For example, one or more parameters of the messaging application are at least one of inbound, outbound, a number of message failures, a number of replications, a message queue, a message delivery, and a frequency of messages.

Figure 5:
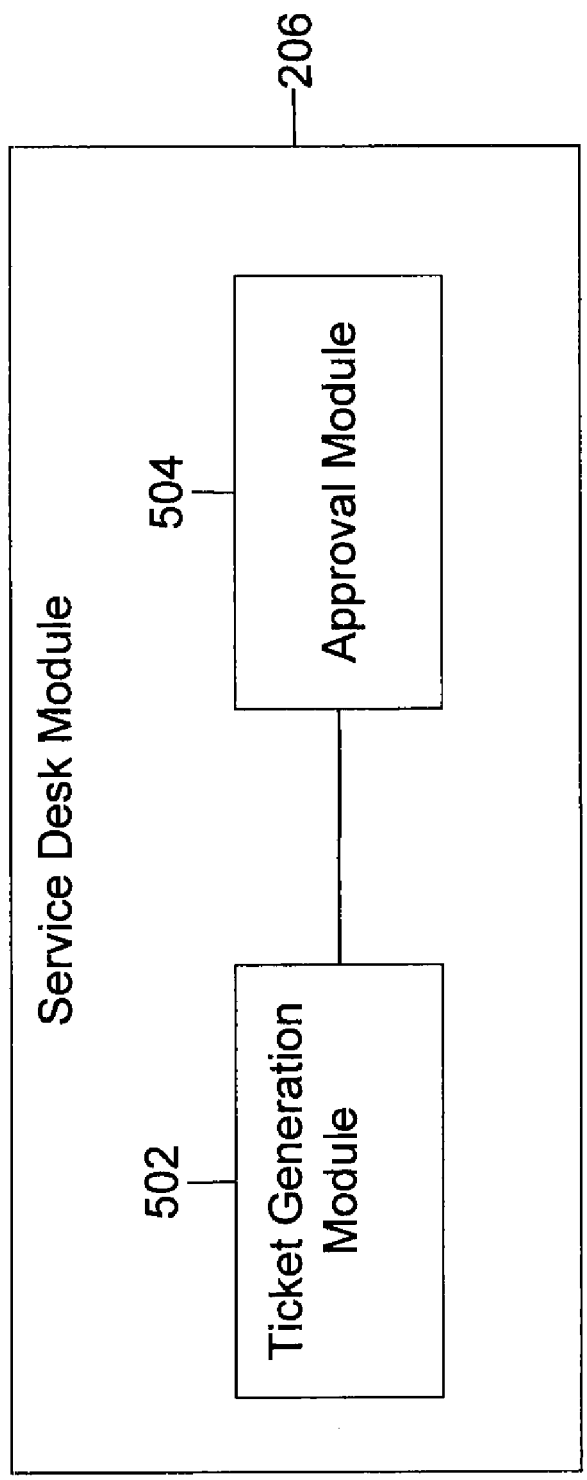
FIG. 5 is a block diagram of a service desk module for managing one or more tickets, in accordance with an embodiment of the invention.

FIG. 5 is a block diagram of a service desk module 206 for managing one or more tickets, in accordance with an embodiment of the invention. Service desk module 206 includes a ticket generation module 502 and an approval module 504.

Ticket generation module 502 receives the one or more tagged alerts from the monitoring module 202 and generates one or more tickets based on the received alerts. Approval module 504 sends the tickets to an authorized approver for approval.

Ticket generation module 502 receives the tagged alerts and generates a ticket corresponding to an alert of the one or more alerts. A ticket includes information corresponding to an alert for resolving the issue corresponding to the alert. The information includes the attributes and additional details, such as cause of the issue, a name of a support person assigned for resolving the issue, replacement information and the time required for resolving the issue. Further, the ticket generation is explained in detail in conjunction with FIG. 6.

Approval module 504 sends the ticket to an authorized approver for approving it. The authorized approver may be a person who is in charge of the IT infrastructural element corresponding to the issue. Additionally, the authorized approver may belong to an organization corresponding to the issue. Further, approval module 504 sends the ticket to support team 110 for resolving the corresponding issue.

As explained earlier, portal module 208 provides a graphical user interface for ticket generation module 502. Portal module 208 displays the activities of ticket generation module 502 graphically. For example, portal module 208 may provide a pie chart depicting priority wise distribution of the tickets, and a table containing details about unattended tickets.

Figure 6:
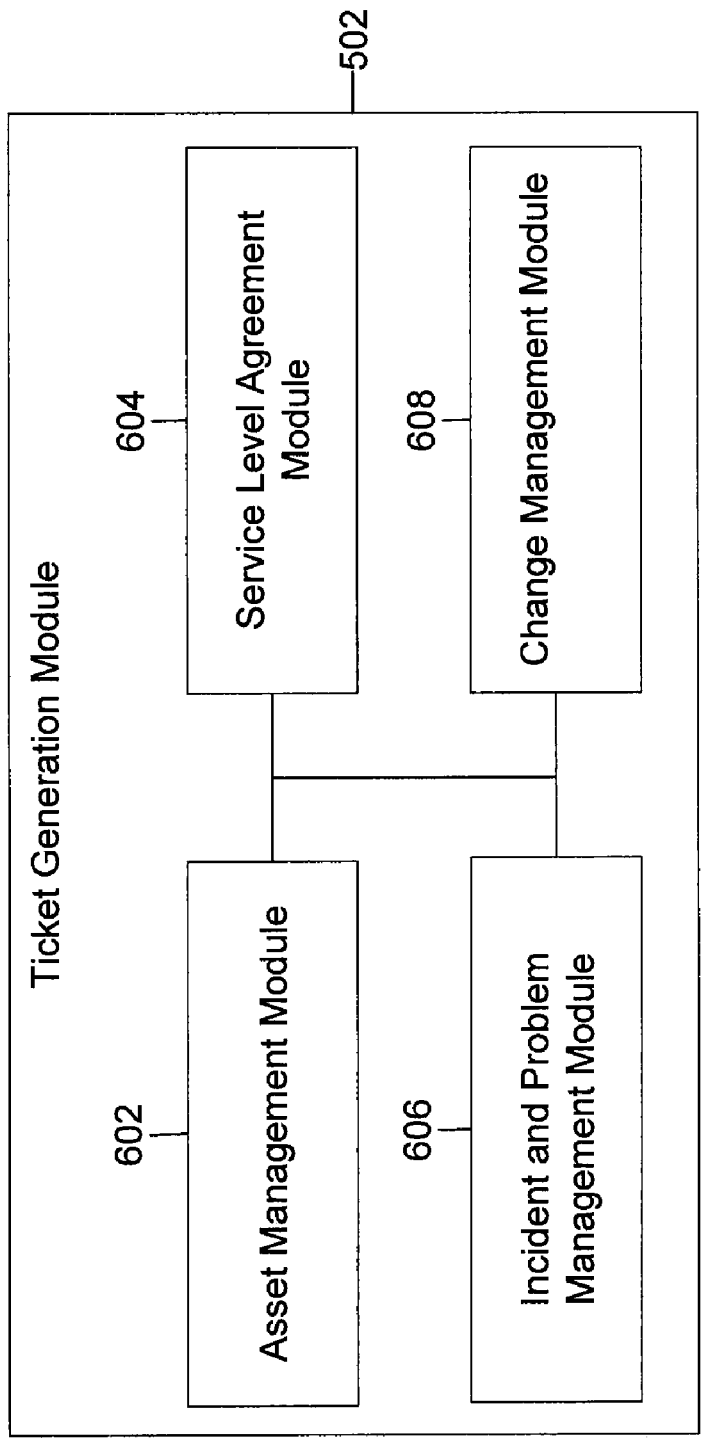
FIG. 6 is a block diagram of a ticket generation module for generating the one or more tickets, in accordance with an embodiment of the invention.

FIG. 6 is a block diagram of ticket generation module 502 for generating the one or more tickets, in accordance with an embodiment of the invention. Ticket generation module 502 includes an asset management module 602, a service level agreement module 604, an incident and problem management module 606 and a change management module 608.

Asset management module 602 manages the asset information of plurality of organizations 102. Service level agreement module 604 stores and manages one or more service level agreements with plurality of organizations 102. Incident and problem management module 606 receives the tagged alerts from event management module 204 and generates tickets corresponding to the tagged alerts based on the service level agreements and asset information provided by asset management module 602. When a replacement of an asset is required for resolving a corresponding issue, change management module 608 adds the relevant replacement information based on the service level agreements and the asset information to the generated ticket.

Asset management module 602 manages the asset information of plurality of organizations 102. Whenever plurality of organizations 102 obtains any asset, a record in asset management module 602 is updated. The assets include IT infrastructural elements 104 and one or more accessories corresponding to IT infrastructural elements 104. Further, examples of the accessories include hard drives, random access memories, central processing units, various connector cables, such as network cables, mouse for computer, keyboards, and the like.

Service level agreement module 604 stores and manages service level agreements with plurality of organizations 102. The service level agreements include terms and conditions of agreement with plurality of organizations 102, types of issues to be managed, time duration for responding and resolving the issues, responsibilities of an IT service providers and so forth.

Incident and problem management module 606 receives the tagged alerts from event management module 204. Incident and problem management module 606 identifies a cause for an issue corresponding to an alert. After identifying the cause, incident and problem management module 606 determines a time period for solving the issue based on the service level agreements with corresponding plurality of organizations 102. Further, incident and problem management module 606 identifies a support person for solving the issue. Thereby, a ticket including the attributes, the cause information and the information about the support person is generated by incident and problem management module 606. This ticket is then provided to change management module 608.

If a replacement of an asset of the one or more assets is required for resolving the issue, then the replacement information is provided in the ticket by change management module 608 based on the service level agreements and the asset information provided by asset management module 602. Change management module 608 identifies an asset for replacement using asset management module 602. The replacement information includes information about the identified asset and time duration for the replacement. The time duration for the replacement of the asset is determined based on the service level agreements. Thereby, a ticket including the replacement information in addition to the attributes, the cause information and information about the support person is generated by change management module 608.

For example, when alert generation module 304 generates an alert corresponding to an issue related to a memory device such as a hard-drive, incident and problem management module 606 identifies a cause for the issue. The cause may be increase in the size of a particular file that leads to increase in the used space in the hard-drive. Thereby, a ticket containing the information related to the cause and the information about the support person for solving the issue is generated and is provided to change management module 608. Change management module 608 identifies a memory device for replacement using asset management module 602. Change management module 608 generates a ticket containing information about the identified memory and time duration for the replacement in addition to the cause information and the information about the support person for solving the issue. The time duration is determined based on the one to more service level agreements.

Figure 7:
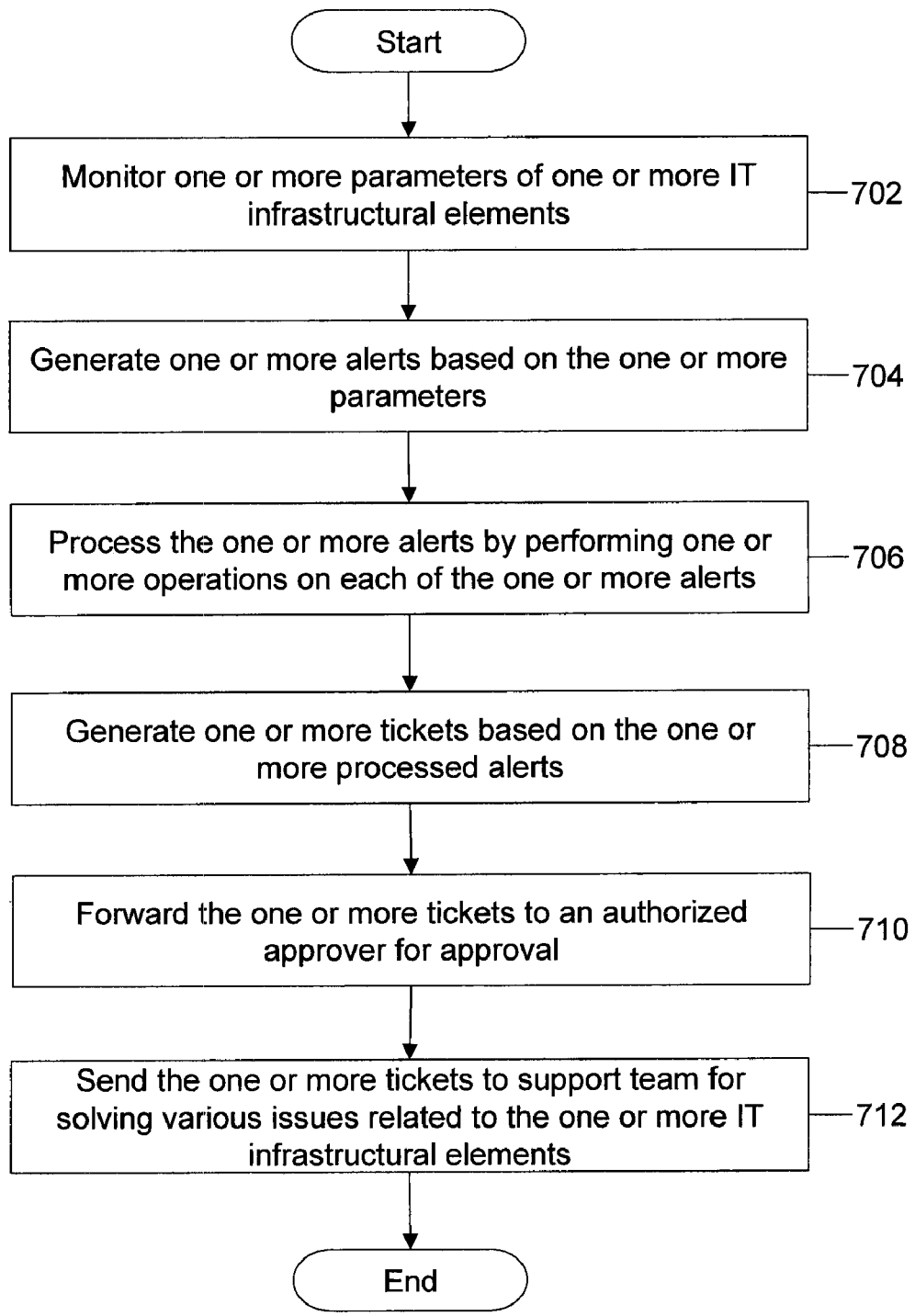
FIG. 7 is a flowchart of a method for managing one or more Information Technology (IT) infrastructural elements of a plurality of organizations, in accordance with an embodiment of the invention.

FIG. 7 illustrates a flowchart of a method for managing one or more Information Technology (IT) infrastructural elements, such as IT infrastructural elements 104a and 104b, of a plurality of organizations, such as organizations 102a, 102b and 102c, in accordance with an embodiment of the invention.

The IT infrastructural elements include operating systems, networks, databases, software applications, and so forth.

At step 702, one or more parameters of the IT infrastructural elements are monitored.

The parameters are monitored by polling the parameters at regular time intervals. The polling is performed by one or more software agents corresponding to the parameters provided to the IT infrastructural elements.

At step 704, one or more alerts corresponding to the parameters are generated. The alerts are generated, based on the one or more threshold values or availability of the one or more IT infrastructural elements.

In an embodiment of the invention, the one or more alerts are generated, based on the one or more monitored parameters. A value of the monitored parameter is compared with the corresponding threshold value. If the value of the parameter is greater than the corresponding threshold value then an alert is generated. For example, if used space in a memory increases beyond a certain percentage, an alert for this issue is generated.

In another embodiment of the invention, the one or more alerts are generated, based on the availability of the one or more IT infrastructural elements. The IT infrastructural elements of the plurality of organizations are considered to be unavailable if the IT infrastructural elements stop functioning. For example, if a server stops functioning, then an alert corresponding to this issue is generated.

At step 706, the one or more alerts are processed to tag the alerts. The processing includes the filtering and the prioritizing of the alerts. The alerts are tagged by assigning the one or more attributes. The one or more attributes include a source of the alert, priority for the alert, information about a user of the one or more IT infrastructural elements, date and time of the issue and location of the corresponding one or more IT infrastructural elements corresponding to the issue. Further, the details of the processing of the alerts are described in conjunction with FIG. 8.

At step 708, one or more tickets corresponding to the one or more tagged alerts are generated. A ticket includes information about the issue corresponding to an alert. The information includes the attributes and additional details, such as cause of the issue, a name of a support person assigned for resolving the issue, replacement information, the time required for resolving the issue and so forth.

At step 710, the ticket is sent to an authorized approver for approval. The authorized approver may be a person who is in-charge of the IT infrastructural element corresponding to the issue. Additionally, the authorized approver may belong to an organization corresponding to the issue.

At step 710, the ticket is sent to a support team, such as support team 110, to resolve the issue.

Figure 8:
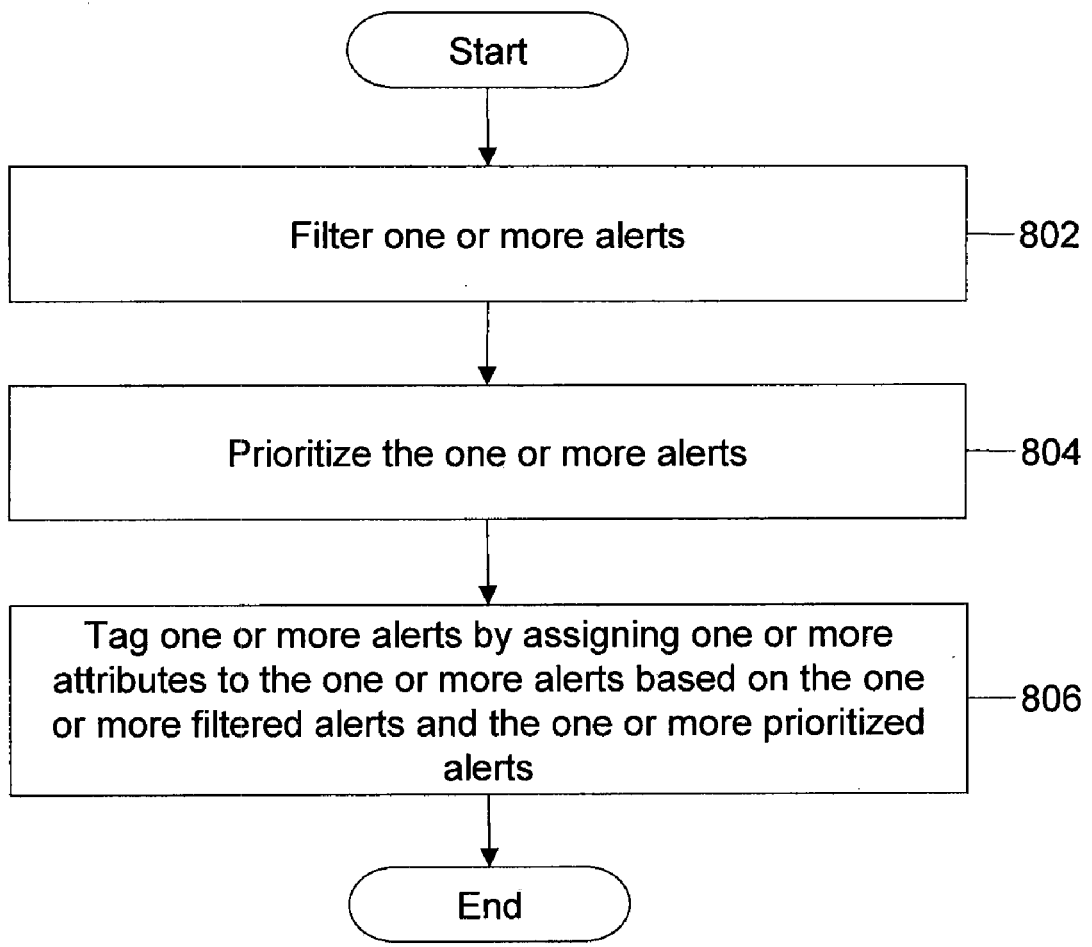
FIG. 8 is a flowchart of a method for processing one or more alerts, in accordance with an embodiment of the invention.

FIG. 8 is a flowchart of a method for processing the one or more alerts, in accordance with an embodiment of the invention.

At step 802, the one or more alerts are filtered to avoid duplicity of alerts originating from the same source.

At step 804, the one or more alerts are prioritized. The prioritizing is performed to assign a priority to the alert corresponding to the issue. The priority is assigned to the alerts, based on the order in which they are generated. For example, if the alert corresponding to a server is generated prior to the alert corresponding to a hard drive, a high priority is assigned to the alert corresponding to the server.

At step 806, the one or more alerts are tagged by assigning one or more attributes, based on the filtered and prioritized alerts. The attributes include at least one of the sources of the issue, the date and time of the issue, the priority associated with the issue, the type of issue, the location of the issue, and so forth.

The system, method and computer program product described above have a number of advantages. The system manages the IT infrastructural elements of multiple organizations. The system provides multi-tenancy to the IT service providers because it can monitor the IT infrastructural elements of multiple organizations simultaneously. Further, the system is also adaptable to integrate products provided by various vendors to monitor the parameters.

The system for managing the Information Technology (IT) infrastructural elements of a plurality of organizations, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means of loading computer programs or other instructions to the computer system. The computer system also includes a communication unit, which enables the computer to connect to other databases and the Internet through an Input/Output (I/O) interface. The communication unit also enables transfer to and reception of data from other databases. The communication unit may include a modem, an Ethernet card, or any similar device, which enable the computer system to connect to databases and networks, such as Local Area Network (LAN), Metropolitan Area Network (MAN), Wide Area Network (WAN) and the Internet. The computer system facilitates inputs from a user through an input device accessible to the system through an I/O interface.

The computer system executes a set of instructions that is stored in one or more storage elements, to process the input data. The storage elements may also hold data or other information, as desired. The storage element may be in the form of an information source or a physical memory element present in the processing machine.

The present invention may be embodied in a computer program product to manage the Information Technology (IT)

infrastructural elements of a plurality of organizations. The computer program product includes a computer-usable medium with a set of program instructions comprising a program code to manage the Information Technology (IT) infrastructural elements of a plurality of organizations. The set of instructions may include various commands that instruct the processing machine to perform specific tasks such as the steps that constitute the method of the present invention. The set of instructions may be in the form of a software program. Further, the software may be in the form of a collection of separate programs, a program module with a large program, or a portion of a program module, as described in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A system for managing one or more Information Technology (IT) infrastructural elements, the one or more IT infrastructural elements belonging to a plurality of organizations, the system comprising:
   a. a monitoring module in communication with a microprocessor and operative to monitor simultaneously one or more parameters of the one or more IT infrastructural elements of the plurality of organizations, each of the one or more parameters being monitored for generating one or more alerts;
   b. an event management module in communication with the microprocessor and operative to process the one or more alerts, the one or more alerts being processed by performing one or more operations on the one or more alerts generated corresponding to infrastructural elements of the plurality of organizations; and
   c. a service desk module in communication with the microprocessor and operative to provide one or more tickets to a support team for remedy of an issue corresponding to each alert of the one or more alerts, the one or more tickets being generated for each of the one or more processed alerts, each of the one or more tickets comprising details of the issue.

2. The system according to claim 1, wherein the one or more IT infrastructural elements comprise at least one of one or more operating systems, one or more networks, one or more databases, and one or more software applications.

3. The system according to claim 1 further comprising a portal module in communication with the microprocessor and operative to provide a graphical user interface to the monitoring module and the service desk module.

4. The system according to claim 1, wherein the monitoring module comprises an agent module in communication with the microprocessor and operative to provide one or more software agents for polling one or more parameters, the one or more software agents being provided to each of the one or more IT infrastructural elements.

5. The system according to claim 4, wherein the agent module comprises a network agent module in communication with the microprocessor and operative to provide at least one software agent of the one or more software agents for polling one or more parameters corresponding to the one or more networks.

6. The system according to claim 4, wherein the agent module comprises a database agent module in communication with the microprocessor and operative to provide at least one software agent of the one or more software agents for polling one or more parameters corresponding to the one or more databases.

7. The system according to claim 4, wherein the agent module comprises an operating system agent module in communication with the microprocessor and operative to provide at least one software agent of the one or more software agents for polling one or more parameters corresponding to the one or more operating systems.

8. The system according to claim 4, wherein the agent module comprises an application agent module in communication with the microprocessor and operative to provide at least one software agent of the one or more software agents for polling one or more parameters corresponding to the one or more software applications.

9. The system according to claim 1, wherein the monitoring module comprises an alert generation module in communication with the microprocessor and operative to generate the one or more alerts for the one or more parameters by comparing each of the one or more parameters to a corresponding threshold value.

10. The system according to claim 1, wherein the monitoring module comprises an alert generation module in communication with the microprocessor and operative to generate the one or more alerts for the one or more parameters based on availability of the one or more IT infrastructural elements.

11. The system according to claim 1, wherein the one or more operations comprise filtering of the one or more alerts, prioritizing of the one or more alerts and tagging the one or more alerts, the tagging being performed by assigning one or more attributes to the one or more alerts based on the one or more filtered alerts and the one or more prioritized alerts.

12. The system according to claim 1, wherein the service desk module comprises a ticket generation module in communication with the microprocessor and operative to generate the one or more tickets.

13. The system according to claim 12, wherein the ticket generation module comprises an asset management module in communication with the microprocessor and operative to manage a plurality of assets for the plurality of organizations.

14. The system according to claim 13, wherein the ticket generation module comprises a Service Level Agreement (SLA) module in communication with the microprocessor and operative to manage one or more service level agreements with the plurality of organizations.

15. The system according to claim 14, wherein the ticket generation module further comprises an incident and problem management module in communication with the microprocessor and operative to:
   a. receive an alert of the one or more alerts;
   b. identify a cause for the issue corresponding to the alert; and
   c. generate a ticket based on at least one of the one or more service level agreements and the cause.

16. The system according to claim 15, wherein the ticket generation module further comprises a change management module in communication with the microprocessor and operative to identify at least one asset of the plurality of assets to be replaced, the at least one asset being identified based on at least one of the one or more service level agreements and the ticket.

17. The system according to claim 1, wherein the service desk module further comprises an approval module in communication with the microprocessor and operative to forward a ticket of the one or more tickets for approval, the ticket being forwarded to an authorized approver.

18. A method for managing one or more Information Technology (IT) infrastructural elements, the one or more IT infrastructural elements belonging to a plurality of organizations, the method comprising:
   a. monitoring one or more parameters of the one or more IT infrastructural elements of the plurality of organizations simultaneously;
   b. generating one or more alerts for the one or more parameters being monitored;
   c. processing the one or more alerts by performing one or more operations on each alert of the one or more alerts generated corresponding to infrastructural elements of the plurality of organizations; and
   d. generating one or more tickets based on the one or more processed alerts, each of the one or more tickets comprising details of an issue corresponding to an alert of the one or more alerts, the one or more tickets being forwarded to a support team for remedy of the issue.

19. The method according to claim 18, wherein the one or more IT infrastructural elements comprise at least one of one or more operating systems, one or more networks, one or more databases, and one or more software applications.

20. The method according to claim 18, wherein the monitoring comprises polling one or more parameters, the polling of the one or more parameters being performed by one or more software agents provided to each of the one or more IT infrastructural elements.

21. The method according to claim 18, wherein the one or more alerts for the one or more parameters are generated by comparing each of the one or more parameters with a corresponding threshold value.

22. The method according to claim 18, wherein the one or more alerts for the one or more parameters are generated based on availability of the one or more IT infrastructural elements.

23. The method according to claim 18, wherein the one or more operations comprise filtering of the one or more alerts, prioritizing of the one or more alerts and tagging of the one or more alerts, the tagging being performed by assigning one or more attributes to the one or more alerts based on the one or more filtered alerts and the one or more prioritized alerts.

24. The method according to claim 18 further comprising forwarding a ticket of the one or more tickets for approval, the ticket being approved by an authorized approver.

25. A computer program product for use with a computer, the computer program product comprising a non-transitory computer usable medium having a computer readable program code embodied therein for managing one or more Information Technology (IT) infrastructural elements, the one or more IT infrastructural elements belonging to a plurality of organizations, the computer readable program code performing:
   a. monitoring one or more parameters of the one or more IT infrastructural elements of the plurality of organizations simultaneously;
   b. generating one or more alerts for the one or more parameters being monitored;
   c. processing the one or more alerts by performing one or more operations on each alert of the one or more alerts generated corresponding to infrastructural elements of the plurality of organizations; and
   d. generating one or more tickets based on the one or more processed alerts, each of the one or more tickets comprising details of an issue corresponding to an alert of the one or more alerts, the one or more tickets being forwarded to a support team for remedy of the issue.

26. The computer program product of claim 25, wherein the one or more IT infrastructural elements comprise at least one of one or more operating systems, one or more networks, one or more databases, and one or more software applications.

27. The computer program product of claim 25, wherein the monitoring comprises polling one or more parameters, the polling of the one or more parameters being performed by one or more software agents provided to each of the one or more IT infrastructural elements.

28. The computer program product of claim 25, wherein the one or more alerts for the one or more parameters are generated by comparing each of the one or more parameters with a corresponding threshold value.

29. The computer program product of claim 25, wherein the one or more alerts for the one or more parameters are generated based on availability of the one or more IT infrastructural elements.

30. The computer program product of claim 25, wherein the one or more operations comprise filtering of the one or more alerts, prioritizing of the one or more alerts and tagging of the one or more alerts, the tagging being performed by assigning one or more attributes to the one or more alerts based on the one or more filtered alerts and the one or more prioritized alerts.

31. The computer program product of claim 25, wherein the computer readable program code further performs forwarding a ticket of the one or more tickets for approval, the ticket being approved by an authorized approver.

* * * * *